(No Model.) 2 Sheets—Sheet 2.
G. L. DAVIS & N. K. WRIGHT.
FILTER.
No. 531,838. Patented Jan. 1, 1895.
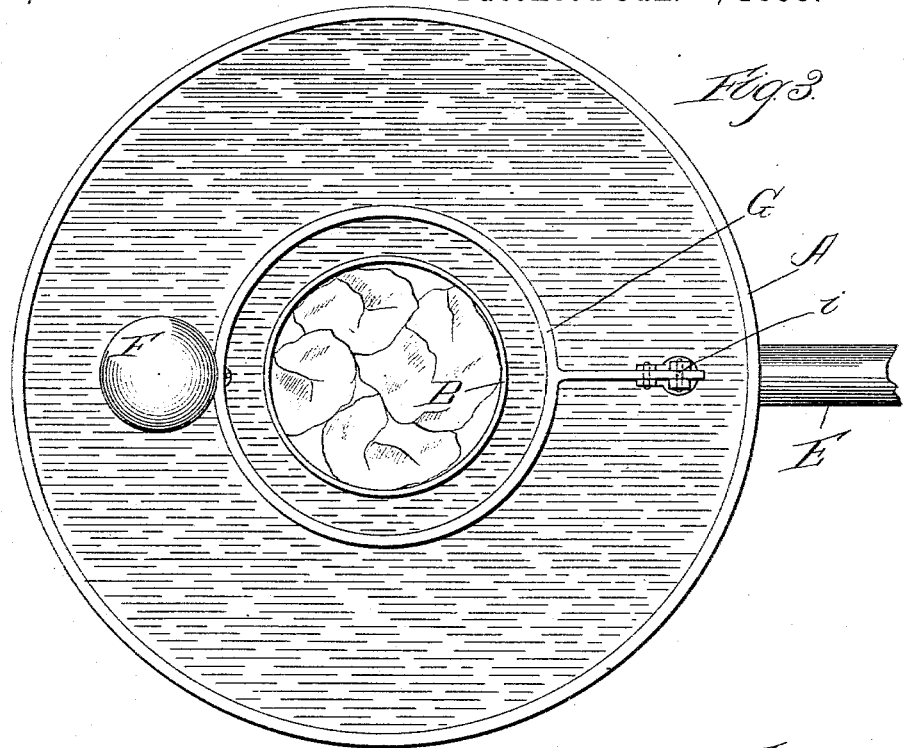
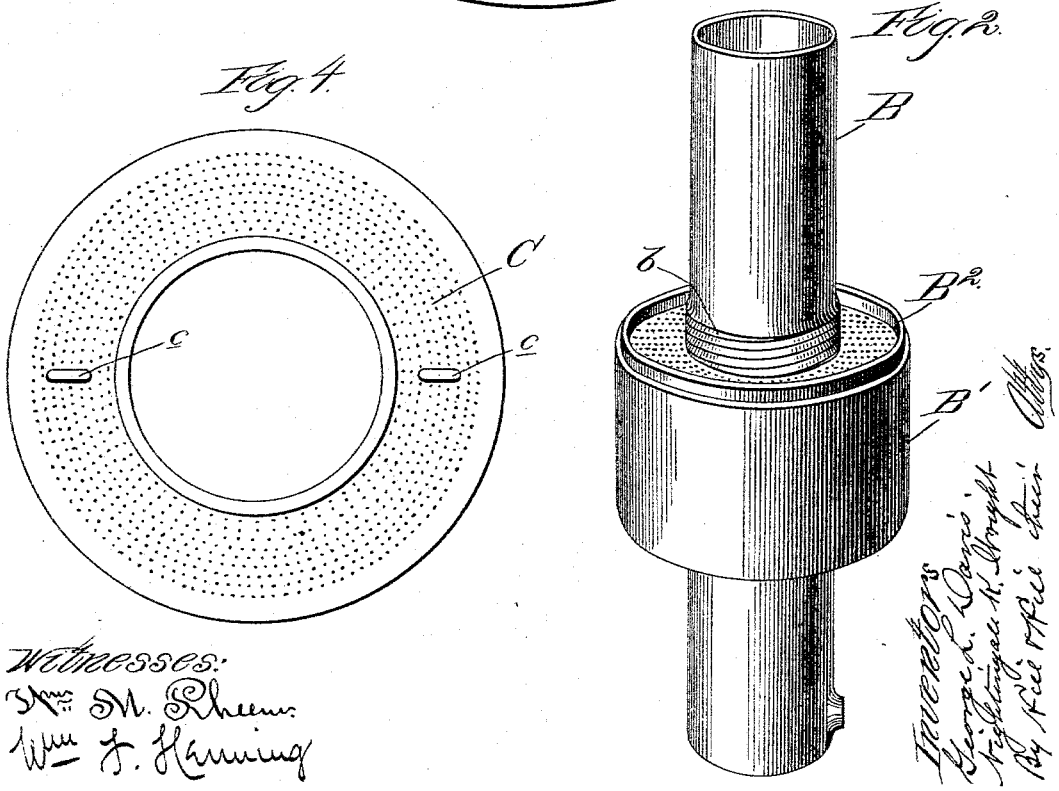

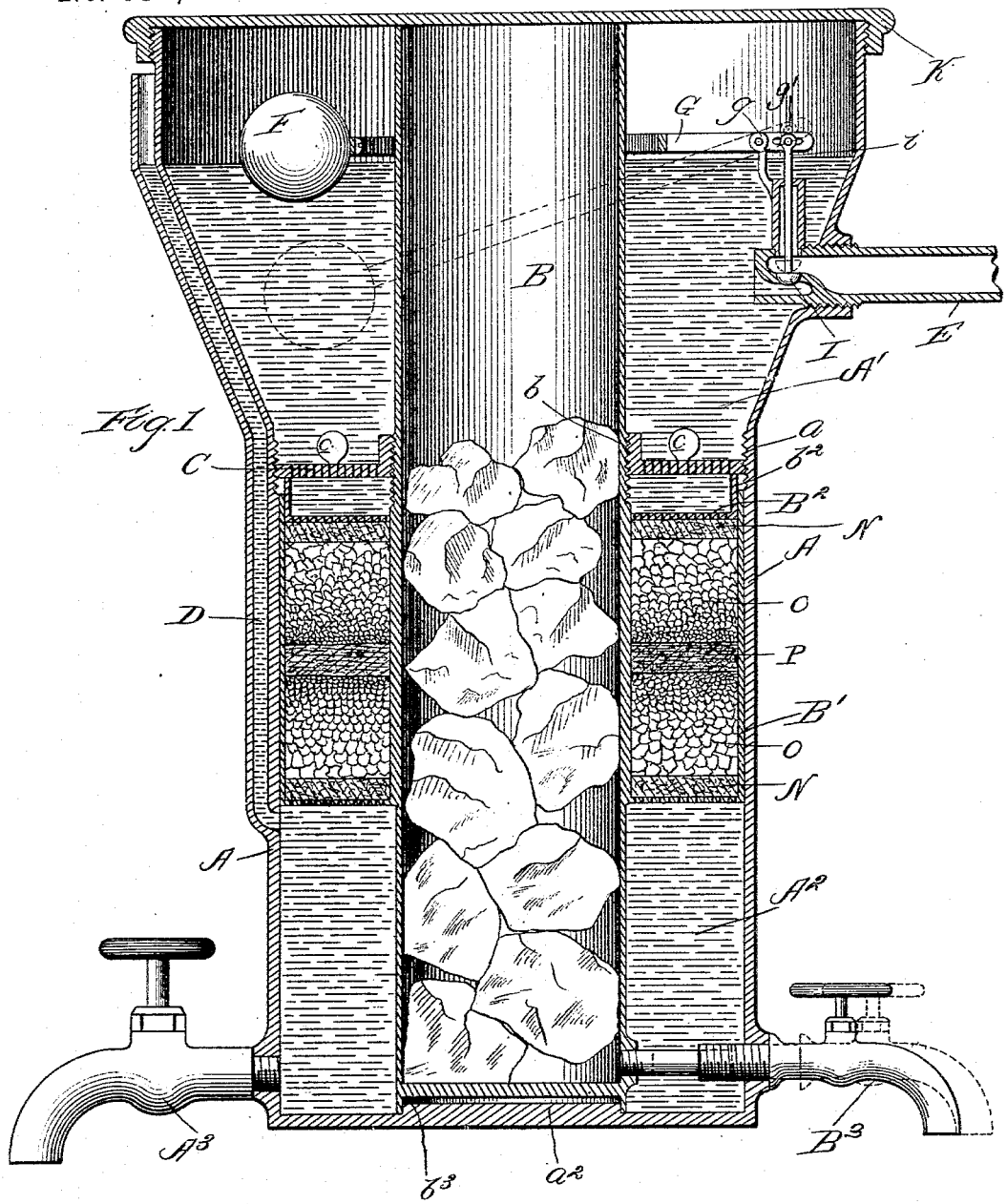

UNITED STATES PATENT OFFICE.

GEORGE L. DAVIS AND NIGHTINGALE K. WRIGHT, OF CHICAGO, ILLINOIS.

FILTER.

SPECIFICATION forming part of Letters Patent No. 531,838, dated January 1, 1895.

Application filed November 13, 1893. Serial No. 490,362. (No model.)

*To all whom it may concern:*

Be it known that we, GEORGE L. DAVIS and NIGHTINGALE K. WRIGHT, citizens of the United States of America, residing at Chicago, county of Cook, and State of Illinois, have invented certain new and useful Improvements in Filters, of which the following is a specification.

Referring to the accompanying drawings wherein like reference letters indicate like or corresponding parts, Figure 1 is a vertical section of our improved filter; Fig. 2, a perspective view of the cooler and filtering chamber, Fig. 3, a top view of the filter with cover removed; and Fig. 4, a view of the top plate of the filtering chamber.

Our invention consists in the novel construction hereinafter described and claimed, in which a central cooler and the filtering chamber are made integral for the reasons set forth.

In our improved filter, the cooler and filtering chamber can be quickly and easily removed for puposes of cleansing or recharging, and while so removed may also be subjected to heat in any preferred way, to destroy the disease germs or microbes that have been separated from the water, and for purposes of purification.

In the preferred form shown in the drawings, we construct an outer vessel A of any desired size or material, by preference using aluminum, and arrange centrally within the same a cooler B adapted to contain ice. About the middle of the cooler we construct a chamber, B', which surrounds the cooler and is made integral therewith in any satisfactory manner. The chamber B' is adapted to contain the filtering medium, and, fitting closely within the vessel A divides it into two parts, A', above, containing the unfiltered water, and $A^2$ below, containing the filtered water. At a point on the interior of the vessel A, at or near the point reached by the top of the filtering chamber we cut a screw thread $a$, preferably entirely around the vessel, and on the cooler on or about the same horizontal line, an external thread $b$. A plate C, having a screw thread cut upon its inner edge to engage with the screw $b$ and upon its periphery adapted to engage with the thread $a$ is designed as a cover to the filtering chamber, and also for the purpose of securing the several parts together to make tight joints, and prevent the displacement or disarrangement of the filtering medium when the cooler and its attendant chamber are removed for any purpose. If desired, a loose cover $B^2$ having an upturned rim $b^2$ upon either the inner or outer edges may be placed upon the filtering chamber before the cover C is placed in position. The screwing down of the cover C will then tend to compress the filtering medium in the chamber. (See Fig. 1.)

An air duct D permits the admission of air to the part $A^2$ to insure a free flow of water from the faucet $A^3$.

A second faucet, $B^3$, penetrates the vessel A and extends into the cooler to draw off the water from the melted ice. A long screwthread at the port engaging with the vessel A permits the faucet to be unscrewed to disengage with the cooler without disengaging from the vessel A.

The medium which is preferably placed in the chamber when the cooler is out of the vessel A may be of any preferred kind, or may consist of two or more materials. By preference we use animal charcoal and two or more layers of cloth.

The mode of operation is as follows:—A layer of preferably asbestos cloth N is first placed in position at the bottom of the chamber and the filtering medium with layers of cloth at intervals, if wished, placed upon the same as desired, filling the chamber nearly to the top. A layer of asbestos cloth is then placed over the medium and the loose cover $B^2$ placed in position. The plate C is then screwed tightly down upon the cover $B^2$ by means of the screw thread on the cooler. The medium is thus compressed and the parts are all secured together. The cooler and chamber are then placed in the vessel A and one or more turns given them by means of the handles, $c$ $c$ causing the outer edges of the plate C to engage with the screw $a$ and bringing the discharge opening in the cooler in line with the faucet $B^3$ which is then secured into the cooler and the filter is ready for operation.

By reversing the operation the cooler and filtering chamber are quickly and easily removed and may then be baked or otherwise heated to destroy germs, microbes, &c.

The substance to be filtered may be put into the vessel by hand, or by a pipe E. If the feed is continuous, some automatic valve device should be employed to regulate the same. One form is shown in Fig. 1 in which the float F operates the circular lever G to seat and unseat the valve I. The operation is obvious and need not be described here. When said device is used, the float and lever may be easily removed by removing the pins $g$ $g'$, when the cooler may be removed or inserted as before described.

In practice, we raise a center $a^2$ on the bottom of the vessel A and make a depression $b^3$ in the bottom of the cooler so those parts will always assume proper engagement.

The filter may be operated by means of gravity or by pressure. In the latter case, the cover K is secured upon the filter in such a manner as to prevent leakage, and the valve device may be removed. A valve device of any desired construction is then placed in the air-duct D to prevent the pressure forcing the water out there.

We do not wish to limit ourselves to the exact construction shown, as the broad idea of our invention rests in making the cooler and filtering chamber integral, so that they may be removed together and be heated or cleansed without disarranging the filtering medium.

What we claim as new, and desire to secure by Letters Patent, is—

1. In a filter, a central cooler extending to a point at or near the bottom of the filter; a chamber adapted to contain the filtering medium, surrounding the cooler, and so secured thereto as to become integral therewith; and a perforated plate adapted to be secured upon the top of the chamber and at its periphery closely engage with the filter; in combination with means for drawing the filtered water; a pipe to draw off the water from the cooler; and means for admitting air to the part containing the filtered water, substantially as and for the purpose set forth.

2. In a filter, the central cooler B, with the screw thread $b$ formed thereon; the filtering chamber B' so secured to the said cooler as to become integral therewith; the plate C, adapted at its inner edge to engage with the thread $b$, and at its periphery to engage with the thread $a$; and means for drawing off the water from the cooler; in combination with the vessel A having the screw thread $a$ upon its interior; means for admitting air to the lower part of said vessel; and a pipe for drawing off the filtered water; substantially as set forth.

3. In a filter a central cooler extending to a point at or near the bottom of the filter; a chamber adapted to contain the filtering medium, surrounding the cooler, and so secured thereto as to become integral therewith; a perforated plate adapted to be secured upon the top of the chamber and at its periphery closely engaged with the filter; pipes for drawing off the filtered water and water from the cooler; and means for admitting air to the part containing the filtered water; in combination with means for automatically controlling the flow of water into the filter above the filtering medium; substantially as and for the purpose set forth.

GEORGE L. DAVIS.
NIGHTINGALE K. WRIGHT.

Witnesses:
CHAS. R. DEAN,
CHARLES S. HILL.